(12) United States Patent
Jevons

(10) Patent No.: US 8,556,579 B2
(45) Date of Patent: Oct. 15, 2013

(54) COMPOSITE AEROFOIL BLADE WITH WEAR-RESISTANT TIP

(75) Inventor: Matthew P. Jevons, Derby (GB)

(73) Assignee: Rolls-Royce PLC, London (GB)

( * ) Notice: Subject to any disclaimer, the term of this patent is extended or adjusted under 35 U.S.C. 154(b) by 597 days.

(21) Appl. No.: 12/778,708

(22) Filed: May 12, 2010

(65) Prior Publication Data
US 2010/0296939 A1 Nov. 25, 2010

(30) Foreign Application Priority Data

May 21, 2009 (GB) .................................. 0908707.3
May 27, 2009 (GB) .................................. 0909003.6

(51) Int. Cl.
*F01D 5/20* (2006.01)
(52) U.S. Cl.
USPC ...................... 415/173.4; 415/174.4; 416/228
(58) Field of Classification Search
USPC ......... 415/173.1, 173.4, 174.4; 416/174, 224, 416/228
See application file for complete search history.

(56) References Cited

U.S. PATENT DOCUMENTS

| | | | |
|---|---|---|---|
| 1,545,560 A | 7/1929 | Heath | |
| 4,411,597 A * | 10/1983 | Koffel et al. | .................... 416/92 |
| 4,680,199 A | 7/1987 | Vontell et al. | |
| 5,024,884 A | 6/1991 | Otfinoski | |
| 5,112,194 A | 5/1992 | More | |
| 5,269,658 A | 12/1993 | Carlson et al. | |
| 5,885,059 A * | 3/1999 | Kovalsky et al. | .............. 416/224 |
| 2007/0099011 A1 | 5/2007 | Wilson | |
| 2007/0147990 A1* | 6/2007 | Kamimura et al. | ......... 415/173.1 |
| 2008/0159868 A1* | 7/2008 | Kray et al. | ................. 416/223 R |
| 2008/0175706 A1 | 7/2008 | Ikeda et al. | |

FOREIGN PATENT DOCUMENTS

| | | |
|---|---|---|
| EP | 1 270 876 A2 | 1/2003 |
| EP | 1 312 760 A2 | 5/2003 |
| FR | 2683764 A1 | 5/1993 |
| GB | 1 311 806 A | 3/1973 |
| GB | 1 437 236 A | 5/1976 |
| WO | WO 92/02410 A1 | 2/1992 |

OTHER PUBLICATIONS

Sep. 11, 2009 Search Report issued in GB 0909003.6.
Sep. 17, 2009 Search Report issued in GB 0908707.3.

* cited by examiner

*Primary Examiner* — Edward Look
*Assistant Examiner* — Juan G Flores
(74) *Attorney, Agent, or Firm* — Oliff & Berridge, PLC

(57) ABSTRACT

The present invention relates to a reinforcing tip cap for an aerofoil blade. The tip cap comprises a body for attaching to the tip of an aerofoil blade and a plurality of abrading elements fixed in the body for abrading a surface against which the tip cap rubs in use.

9 Claims, 5 Drawing Sheets

COMPOSITE AEROFOIL BLADE WITH WEAR-RESISTANT TIP

The present invention relates to a composite aerofoil blade with a wear-resistant tip and to a method of manufacturing the same.

In a ducted fan, such as is commonly used in an aero engine, for example, a fan is disposed co-axially within a duct and is driven to rotate within the duct to direct air rearwardly through the duct.

For efficiency and stability of the fan blades the gaps between the tips of the blades and the inner casing of the duct within which the fan rotates must be kept to a minimum so as to minimise leakage of air around the tips of the blades.

However, with smaller clearances between the blade tips and the duct casing comes the likelihood that some rubbing between the two will take place in certain operating conditions. For example, when the speed of rotation of the fan increases the blades can elongate due to centrifugal forces. Also, for an aero engine, during certain maneuvers of the aircraft gyroscopic forces may temporarily cause the fan and duct to come out of perfect axial alignment which can lead to rubbing of the blade tips against the casing.

To accommodate this rubbing, the duct casing is provided with a lining comprising a sacrificial abradable layer which is designed to be cut or rubbed away by the blade tips. The liner is sometimes referred to as a Fan Track Liner (FTL).

For a metal blade, such as a blade of titanium alloy, this abrasion, and the temperatures of between 700-800° C. which it causes, presents no serious problem. However, in the interests of weight saving, aero engine manufacturers are increasingly looking to composite materials for manufacturing primary components such as fan blades. A composite fan blade typically comprises layers of fabric containing fibres which have high tensile strength, such as carbon fibres, embedded in an epoxy resin matrix. The tip of a blade made of such composite material would not abrade the sacrificial abradable layer in the duct casing. Instead the blade tip itself would become worn down by the rubbing. In any case the epoxy resin would melt at the temperatures generated by the abrasion which could potentially lead to disintegration of the blade.

Attempts have been made to reinforce a composite blade tip using cutting elements of high wear resistance. U.S. Pat. No. 5,112,194 exemplifies such an approach and describes embedding boron rod-like filaments in the composite tip. However, this solution is not without its problems. Firstly, boron rods, though very hard, are brittle and could shatter during the rubbing of the blade tip against the liner material. Also, the process of embedding the rods in the lay-up of the blade could be costly and time consuming. Furthermore, the relatively large diameter of the boron rods, when compared with the fibres within the blade composite, will result in plies being displaced to accommodate the rods. This causes local stress concentrations which act in the weakest direction of the laminate structure and which can degrade blade-tip performance in the event of a bird strike, for example.

Embodiments of the present invention aim to address at least partly the disadvantages of the prior art.

The present invention is defined in the attached independent claims, to which reference should now be made. Further, preferred features may be found in the sub claims appended thereto.

According to the invention there is provided a reinforcing tip cap for an aerofoil blade, comprising a body for attaching to the tip of an aerofoil blade and a plurality of abrading elements fixed in the body for abrading a surface against which the tip cap rubs in use.

Preferably the tip cap is a wear-resistant tip cap which is arranged in use to reinforce the tip of an aerofoil blade against wear.

The body may be arranged to wrap around a tip of an aerofoil blade, and be bonded thereto, such that the abrading elements become disposed at positions along the edge of the tip of the blade in a chordwise extent.

The abrading elements are preferably configured within the body so as to cause maximum abrasion of a surface against which the tip cap rubs in use.

In a preferred arrangement the abrading elements are embedded in the body such that they extend in a spanwise- or Z-direction with respect to the blade in use.

The body may be of a composite material including a matrix and reinforcing fibres.

Preferably the abrading elements comprise at least one of the following: straight pins, crossover pins, bundles of fibres, staples.

At least some of the abrading elements may be embedded in a vibration-damping material.

The invention also includes an aerofoil blade reinforced at its tip with a tip cap according to any statement herein.

The aerofoil blade may be of composite material.

The invention also includes an aero engine having an aerofoil blade reinforced at its tip with a tip cap according to any statement herein.

The invention also includes a method of reinforcing an aerofoil blade tip comprising attaching to the blade tip a tip cap according to any statement herein.

Preferred embodiments of the invention will now be described, by way of example only, with reference to the accompanying diagrammatic drawings, in which.

Figure 1:
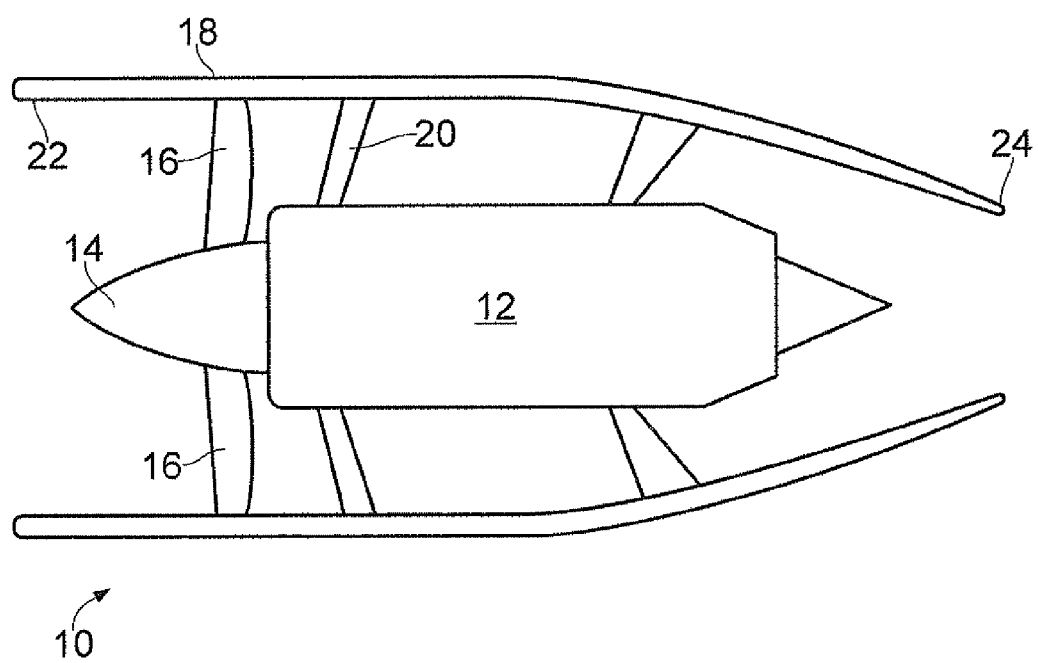
FIG. 1 shows schematically part of a turbofan aero engine.

Turning to FIG. 1, this shows schematically generally at 10 a turbofan aero engine comprising a core 12 which provides drive to a rotary fan 14 having a plurality of circumferentially spaced fan blades 16 thereabout. A nascelle 18 surrounds the core 12 and is mounted thereon by struts 20. The nascelle has an inlet 22 and an exhaust nozzle 24 and forms a duct casing around the fan 14. In use, air is drawn in via the inlet 22 and compressed by the fan 14. Some of the compressed air is fed into the core 12 which includes further compressor stages, a combustor and a turbine which drives the fan 14 (none of which are shown in this diagram). The rest of the air, so called bypass air, is ducted around the outside of the core 12 and through the exhaust nozzle 24.

In the interests of efficiency and of stability of the fan blades 16 leakage of air around the tips of the blades 16 should be kept to a minimum. Typically the blades have only a few millimeters of clearance between their tips and the inside surface of the duct casing. A sacrificial layer (not shown) of abradable material forms a liner around the inside of the duct casing.

In accordance with an embodiment of the present invention, in order to avoid damaging the tips of the composite blades as they rub against the abradable liner, the blade tips are protected by a reinforcing cap of highly wear-resistant material as will now be described with reference to FIGS. 2a and 2b.

Figure 2A:
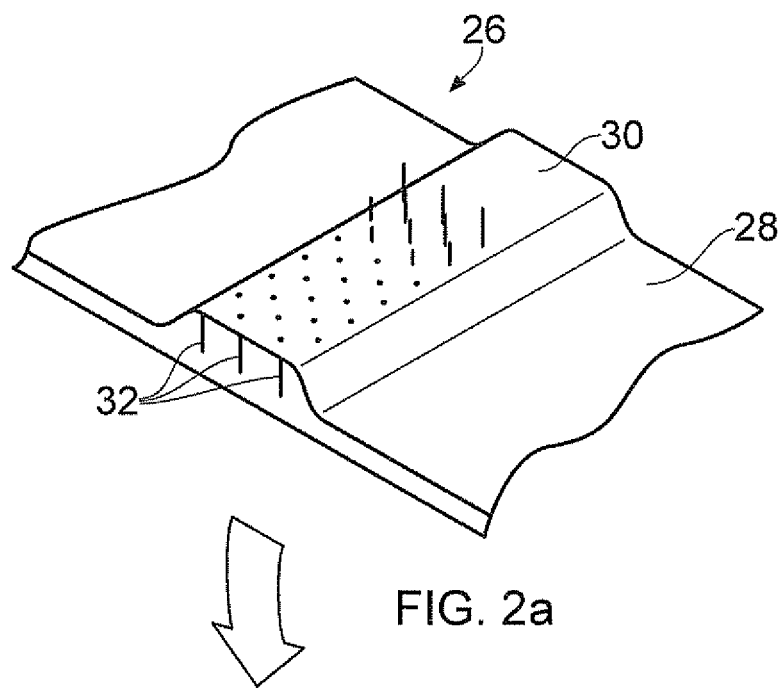
FIGS. 2a and 2b show schematically a tip reinforcement cap according to an embodiment of the present invention.

FIG. 2a shows a composite tip reinforcing cap 26 in a flat configuration prior to attachment to a blade tip. The tip cap 26 is made up of a body 28 comprising layers of carbon fibre material in an epoxy resin, for example the same material as is used in the main body of the aerofoil blade. A thickened strip 30 is formed centrally in the body 28 and this will later extend chordwise along the tip of the blade. Abrading elements in the form of reinforcing pins 32 comprising bundles of carbon fibres, and known as Z-pins, are inserted in the through thickness direction into the tip cap along the thickened strip 30 using an ultrasonic gun. The Z-pins 32 are arranged in rows of at least three in the tip cap, and successive rows are staggered one behind the other.

Figure 2B:
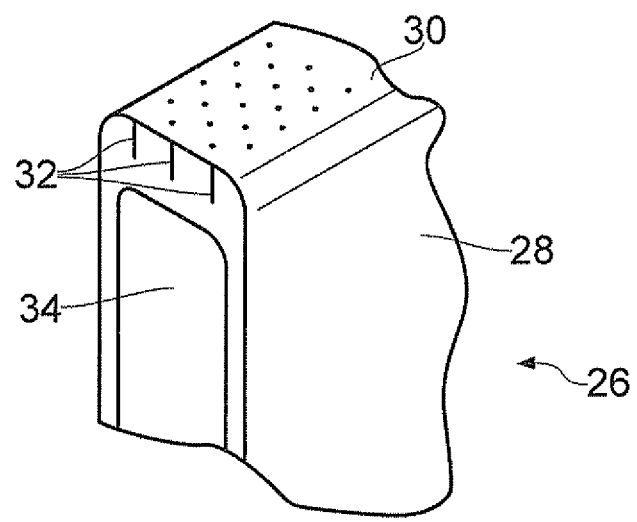

The tip cap 26 is then wrapped around the edge of a composite blade tip 34, as is shown in FIG. 2b. The thickened strip 30 which bears the pins 32 is located along the edge of the blade tip, such that the pins are straight and extend towards the blade tip in a spanwise or "Z" direction with respect to the fan blade 16.

The tip caps may be formed predominately of composite material which may be reinforced with carbon, glass or any other appropriate fibres. Beneficially, the cap can be co-bonded to the aerofoil The wraps can be made from other fibre-reinforced plastics such as glass fibres, aramid fibres, polymeric fibres and natural fibres, and can be combined with appropriate resins known in the art including, but not limited to, thermoplastic or phenolic ones. As an alternative to being co-bonded the cap can be co-cured (i.e. cured as one in the same mould) with the aerofoil or secondary bonded (adhered together after initial curing). Co-curing has the benefit of offering the best possible bond surface as the resin flows between the blade and the wrap which effectively become a single component. Whilst this process is complex and expensive it offers the best mechanical properties. With secondary bonding the protective cap is cured separately and is then bonded to the blade in an extra processing step. The cap can be preformed using tape-laying or hot forming or even a hand layup technique.

Alternatively, metals or plastics can be used for the caps although it may not be viable to co-cure or co-bond them thus adding complexity to the assembly process.

Figure 3:
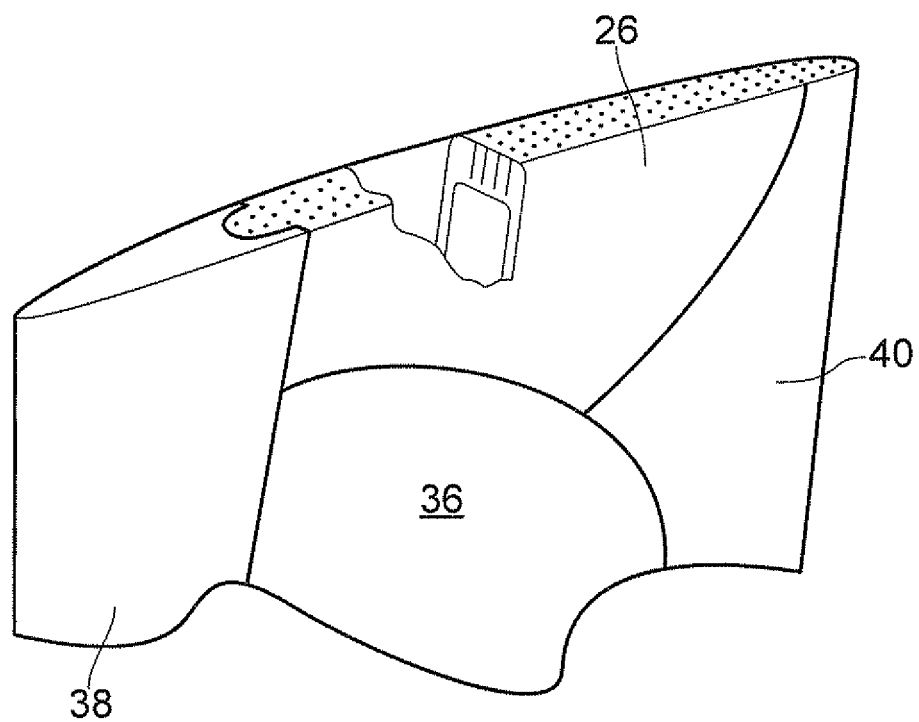
FIG. 3 shows a composite fan blade with the reinforcement cap of FIGS. 2a and 2b mounted thereon.

FIG. 3 shows the end portion of a composite blade 16 partly cut away to show the tip cap 26 in sectional view. The blade 16 also includes a main aerofoil body 36 and a titanium alloy leading edge component 38 and trailing edge reinforcing component 40 both bonded to the body 36.

Figure 4:
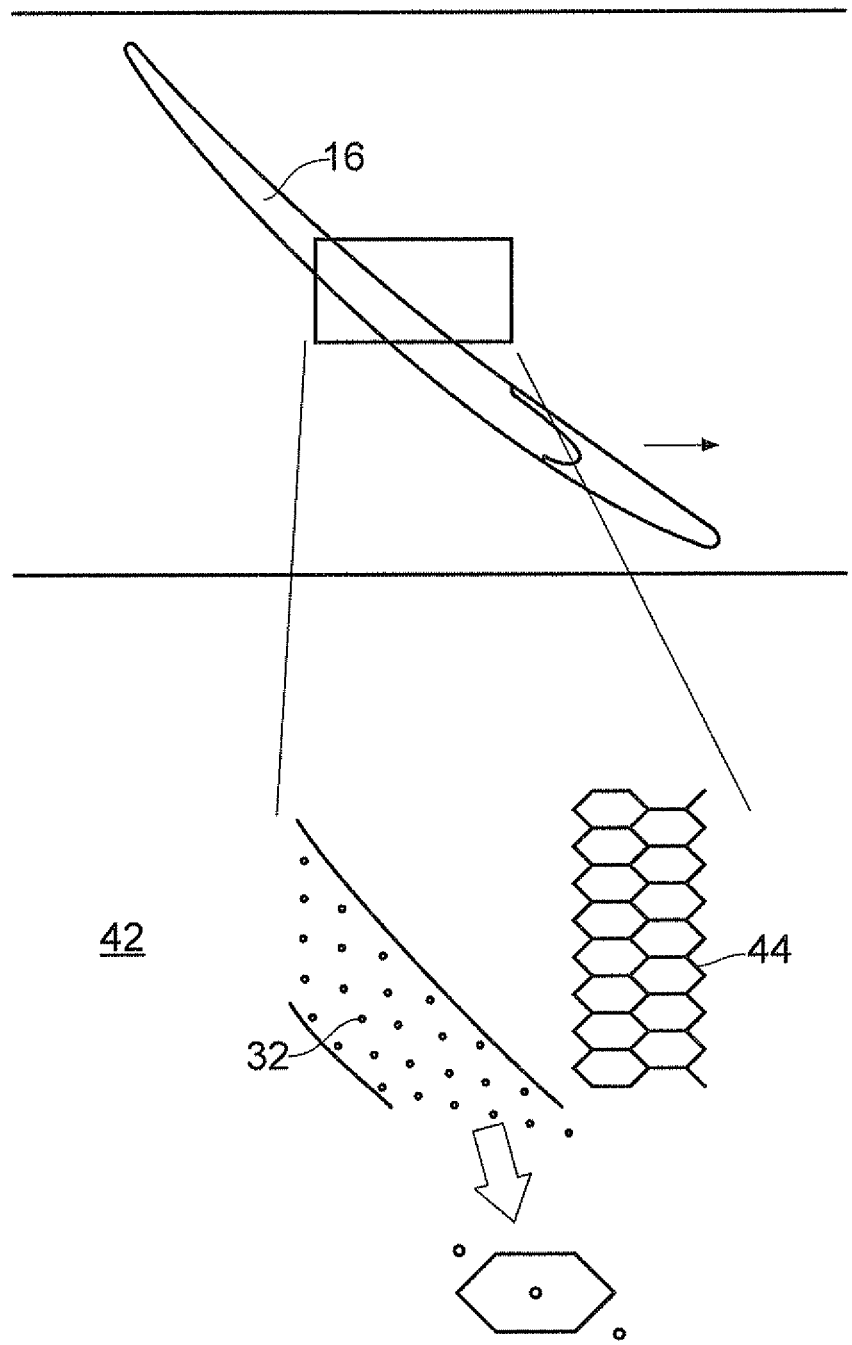
FIG. 4 shows schematically a duct casing liner and fan blade according to FIGS. 2a and 2b and FIG. 3.

FIG. 4 shows somewhat schematically a fan blade 26 passing close to the inside surface of a duct casing 42 which has a duct casing liner—or so called fan track liner 44. The abradable liner 44 comprises a Nomex® honeycomb structure filled with lightweight epoxy filler. When the blade tip rubs the liner the Z-pins 32 cut into the liner material. The spacing of the pins 32 and staggering of successive rows are designed to cause maximum degradation of the honeycomb cells 44 of the liner. In particular the arrangement of pins 32 is chosen to cut through edges and vertices of the honeycomb structure thereby causing its disintegration, such that the remaining material can be harmlessly swept away by the blade 16 without causing damage to the blade or to any downstream component.

Figure 5A:
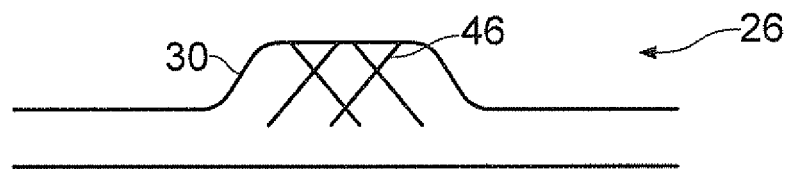
FIGS. 5a-5c show schematically three further embodiments of tip reinforcement cap according to the present invention.
Figure 5B:
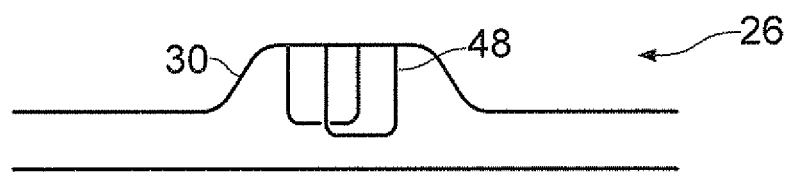
Figure 5C:
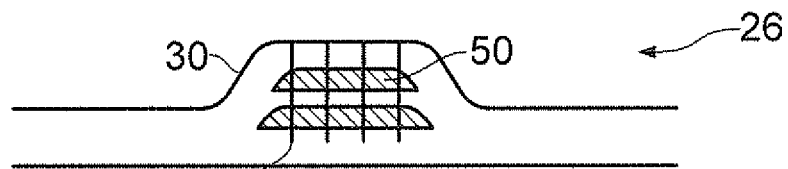

FIGS. 5a-5c show alternative embodiments of the reinforcing tip cap 26.

In particular, in the embodiment shown in FIG. 5a the abrading elements are crossover pins 46 which are embedded in the thickened strip in much the same way as the Z-pins 32 of the FIG. 2 embodiment.

In FIG. 5b the abrading elements are staples 48 of titanium. This a particularly good choice of abrading element as the staples are firmly embedded in the tip cap 26 and will neither fall out nor shatter in use.

FIG. 5c shows an embodiment in which the abrading elements are Z-pins as in the FIG. 2 embodiment, but in this example the pins are embedded in elastomeric inserts 50 which provide local damping of vibration during rubbing, so as to resist shattering of the pins.

Other abrading elements could be used such as glass fibre pins, aramid fibre pins, or metal pins, such as of titanium or invar. To resist the build up of heat during rubbing of the tip against the liner, the tip cap 26 can be interleaved with metal foils and/or coated with a metallic coating to dissipate heat away from the tip.

The embodiments of the tip cap described above provide several advantages. In particular, they are inexpensive to manufacture and can be readily repaired or replaced. Also the abrading elements do not compromise the blade tip performance. The elements themselves effectively slice, or cut, through the liner material individually as opposed to rubbing or grinding which would be the case with a continuous tip edge. Accordingly, less heat is generated.

The invention claimed is:

1. A composite aerofoil blade reinforced at its tip with a reinforcing tip cap, the reinforcing tip cap comprising:
    a body configured for attaching to the tip of the composite aerofoil blade; and
    a plurality of abrading elements fixed in the body configured for abrading a surface against which the reinforcing tip cap rubs in use, wherein
    the body is formed of a composite material including a matrix and reinforcing fibers.

2. The tip cap according to claim 1, comprising a wear-resistant tip cap configured to reinforce the tip of an aerofoil blade against wear.

3. The tip cap according to claim 1, wherein the body is configured to wrap around the tip of the aerofoil blade, and bonded thereto, such that the abrading elements are disposed at positions along the edge of the tip of the blade in a chordwise extent.

4. The tip cap according to claim 1, wherein the abrading elements are embedded in the body such that they extent in a spanwise- or Z-direction with respect to the composite aerofoil blade.

5. The tip cap according to claim 1, wherein the abrading elements include at least one of the following: straight pins, crossover pins, bundles of fibers, or staples.

6. The composite aerofoil blade according to claim 1, wherein the reinforcing tip cap is secured to the composite aerofoil blade by an adhesive.

7. The composite aerofoil blade according to claim 1, wherein the reinforcing tip cap wraps around the tip of the composite aerofoil blade.

8. An aero engine comprising:
    a composite aerofoil blade; and
    the reinforcing tip cap according to claim 1, wherein
    the composite aerofoil blade is reinforced with the reinforcing tip cap.

9. A method of reinforcing a composite aerofoil blade tip at its tip with a reinforcing tip cap, the method comprising:
    attaching to the composite blade tip a reinforcing tip cap having:

a body configured for attaching to the tip of the composite aerofoil blade; and
a plurality of abrading elements fixed in the body configured for abrading a surface against which the reinforcing tip cap rubs in use, wherein
the body is formed of a composite material including a matrix and reinforcing fibers.

* * * * *